3,491,287
SALINOMETER INCLUDING FIRST AND SECOND ORDER TEMPERATURE COMPENSATION AND THIRD COMPENSATION FOR VARIATIONS BETWEEN CONDUCTIVITY AND SALINITY
Neil L. Brown, El Cajon, Calif., assignor to The Blissett-Berman Corporation, Santa Monica, Calif., a corporation of California
Filed Apr. 14, 1967, Ser. No. 631,053
Int. Cl. G01r 11/44
U.S. Cl. 324—30                    19 Claims

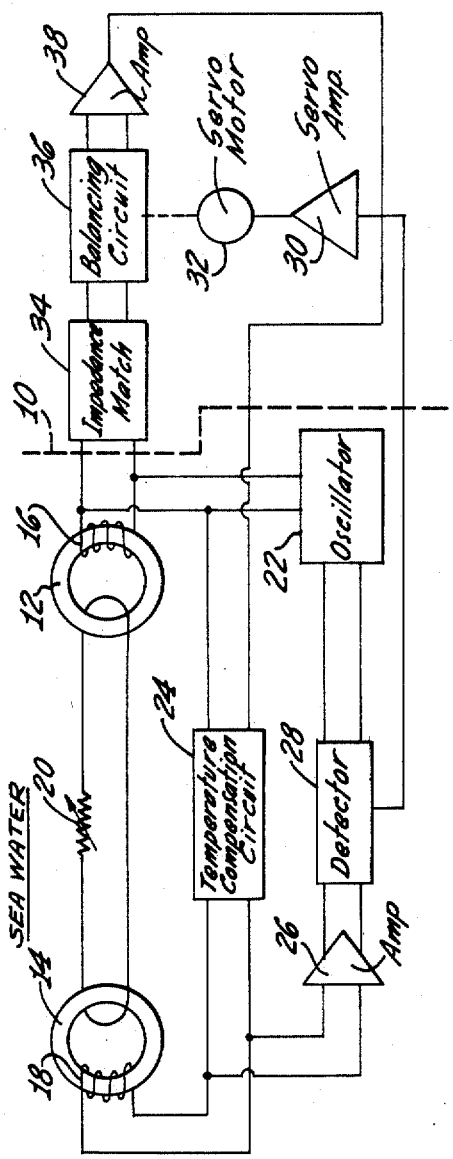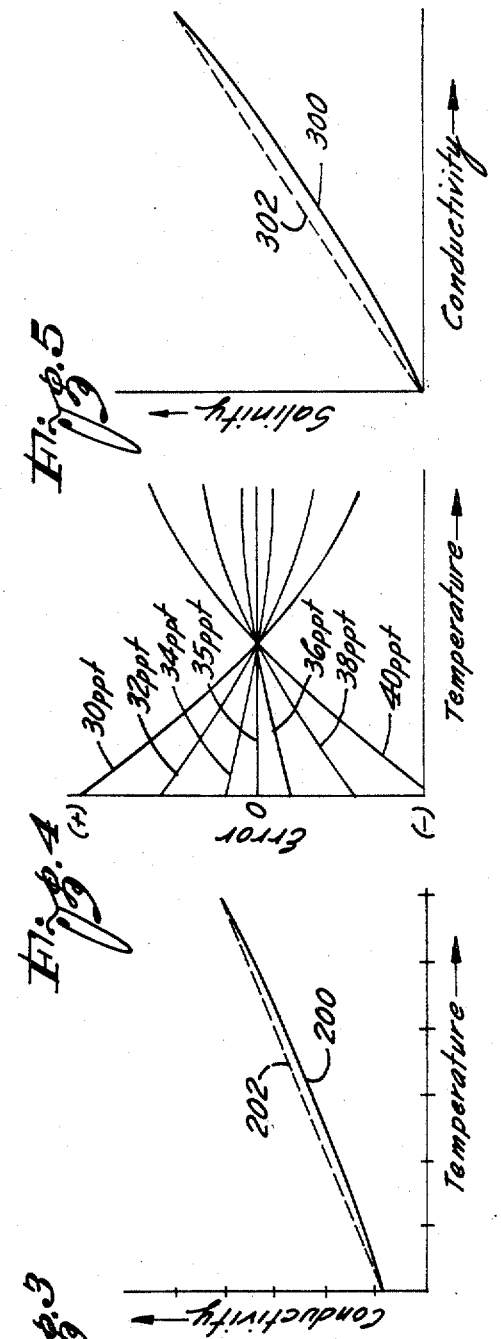

ABSTRACT OF THE DISCLOSURE

The present invention relates to a compensated salinometer which provides for an in situ measurement of the salinity of sea water by measuring the conductivity of the sea water and wherein the compensated salinometer of the present invention includes first order temperature compensating means for compensating for variations in the conductivity of the sea water with changes in the temperature of the sea water, second order temperature compensating means for compensating for errors in the first order temperature compensation with changes in the salinity of the sea water, and third compensating means for compensating for the variations in the ratio between conductivity and salinity of the sea water. The various compensating means described above are included in a closed loop circuit which is part of the measurement instrument of the present invention and the present invention also includes means for automatically balancing the closed loop to provide for a continuous indication of the salinity of the sea water in accordance with the automatic balancing of the closed loop.

---

In recent years, scientists have been increasing their exploration and study of the oceans. The growth of the science of oceanography has increased the need for reliable instruments to provide measurements of the various parameters of sea water. One of the most important parameters to be measured is the salinity of sea water. The salinity of sea water is basically defined as the ratio of the total dissolved solids to the total weight of the sea water. Originally the measurement of the salinity of sea water was a time-consuming and cumbersome task. First, samples of the sea water were collected from various depths. The samples of sea water were then subjected to a titration process in a laboratory to provide for a measurement of the dissolved solids in the sea water. The titration process, therefore, provided for a direct measurement of the salinity of the sea water but the process was slow and cumbersome. Also, the titration process was essentially limited for use with discrete samples rather than a continuous measurement of the salinity.

It was recognized at an early date that there was a relationship between the conductivity of the sea water and the salinity of the sea water. Therefore, attempts were made to develop instruments which would provide for a reading of the salinity of the sea water in accordance with the measurement of the conductivity of the sea water. Laboratory instruments were first developed and these laboratory instruments usually produced a reading of salinity by comparing the ratio of the conductivity of a test sample of sea water to the conductivity of a standard sample of water having a known salinity and wherein the ratio was determined with both samples at the same temperature. The test samples of the sea water were taken at various depths so as to develop a profile of the salinity of the sea water. This above described comparison method was simple and could be performed on board ship, but only discrete points in the sea water could be measured and also there was a time differential between the time the sample was taken and the time the salinity was determined.

The success of the above described comparison instruments which provided for a measurement of salinity in accordance with conductivity led to the development of in situ salinity instruments. The in situ salinity instruments which have been developed are generally of two types. The first type of in situ salinity measurement system transmits conductivity, temperature and pressure information from sensors located underwater to a collecting station such as a ship, and with a subsequent computation of salinity from the transmitted information. The collecting station such as the ship may contain a computer so as to provide for a rapid computation of salinity from the transmitted information.

The second type of in situ salinity measurement system uses conductivity, temperature and pressure sensors combined in a salinity sensing unit located underwater to produce salinity information directly and with a transmittal of the salinity information from the underwater sensor to the collecting station such as the ship for direct recording. The second type of system provides for a direct continuous salinity measurement without the need of further computation, and the accuracy requirements for the transmittal of the information for the second type of system is not as great as for the first type of system.

An in situ salinity measurement system of the second type is shown in U.S. Patent No. 3,419,796, issued Dec. 31, 1968, in the name of Neil L. Brown and assigned to the same assignee as the instant application. The present invention is directed to an improved in situ salinity measurement instrument of the type shown in said patent and specifically the present invention is directed to a salinity measurement instrument which provides for an automatic balancing and correction of errors. The present invention is also directed to an improved measurement system of the type shown in the copending application where the output indication of the salinity is automatically controlled to provide for a continuous reading of the salinity.

The aforementioned U.S. Patent No. 3,419,796 discloses an in situ salinity instrument which includes partial temperature and pressure compensation. Generally, the in situ salinity instrument shown in said patent uses a pair of inductive windings located in the sea water and wherein the sea water provides for a coupling loop between the pair of windings. The conductivity of the sea water determines the coupling between the first and second windings and, as indicated above, the conductivity of the sea water may be used to indicate the salinity of the sea water. However, the temperature of the sea water also affects the conductivity of the sea water independently of the salinity and, in addition, the pressure to which the sea water is subjected affects the conductivity of the sea water independently of the salinity.

Patent No. 3,419,796 provides for a partial compensation of the variations of the conductivity of the sea water with changes in temperature and pressure. Specifically, the in situ salinity instrument shown in said patent provides for a first order temperature compensation of the conductivity for one particular value of salinity. However, as the salinity of the sea water varies, the first order temperature compensation provided by said patent is not complete since the necessary temperature compensation also varies in accordance with the salinity. The present invention, therefore, provides for a second order temperature compensation to vary the first order temperature compensation in accordance with changes in salinity.

In addition to the changes in temperature compensation necessary because of changes in salinity, the ratio of conductivity to salinity is not a linear function. The present invention, therefore, provides for compensation for variations in the ratio between conductivity and salinity so that the salinity reading is extremely accurate over broad ranges of temperature and salinity. Pressure compensation may be provided for with the present invention using the methods as disclosed in U.S. Patent No. 3,419,796.

The compensation for the various errors discussed above are included in the in situ salinity instrument of the present invention as part of a closed loop system. Included in the closed loop system of the present invention is a variable element such as a potentiometer. A measurement of the salinity is produced in accordance with the difference between the input signal to a first inductive winding and the output signal from a second inductive winding and wherein the output signal from the second inductive winding has been corrected for the various errors as described above. A control signal in accordance with the difference between the first input signal and the second output signal is used to control the variable element in the closed loop so as to balance the closed loop. The balancing of the closed loop provides for a continuous measurement of salinity. A clearer understanding of the invention will be had with reference to the following description and drawings wherein:

FIGURE 1 is a block diagram of an in situ salinity instrument constructed in accordance with the teachings of the present invention;

FIGURE 3 is a curve illustrating the relationship between the conductivity and temperature of sea water for a particular value of salinity of the sea water;

FIGURE 4 is a curve illustrating the relationship between the errors in temperature compensation with changes in temperature of the sea water for particular values of salinity; and FIGURE 5 is a curve illustrating the ratio of salinity to conductivity of sea water.

Figure 2:
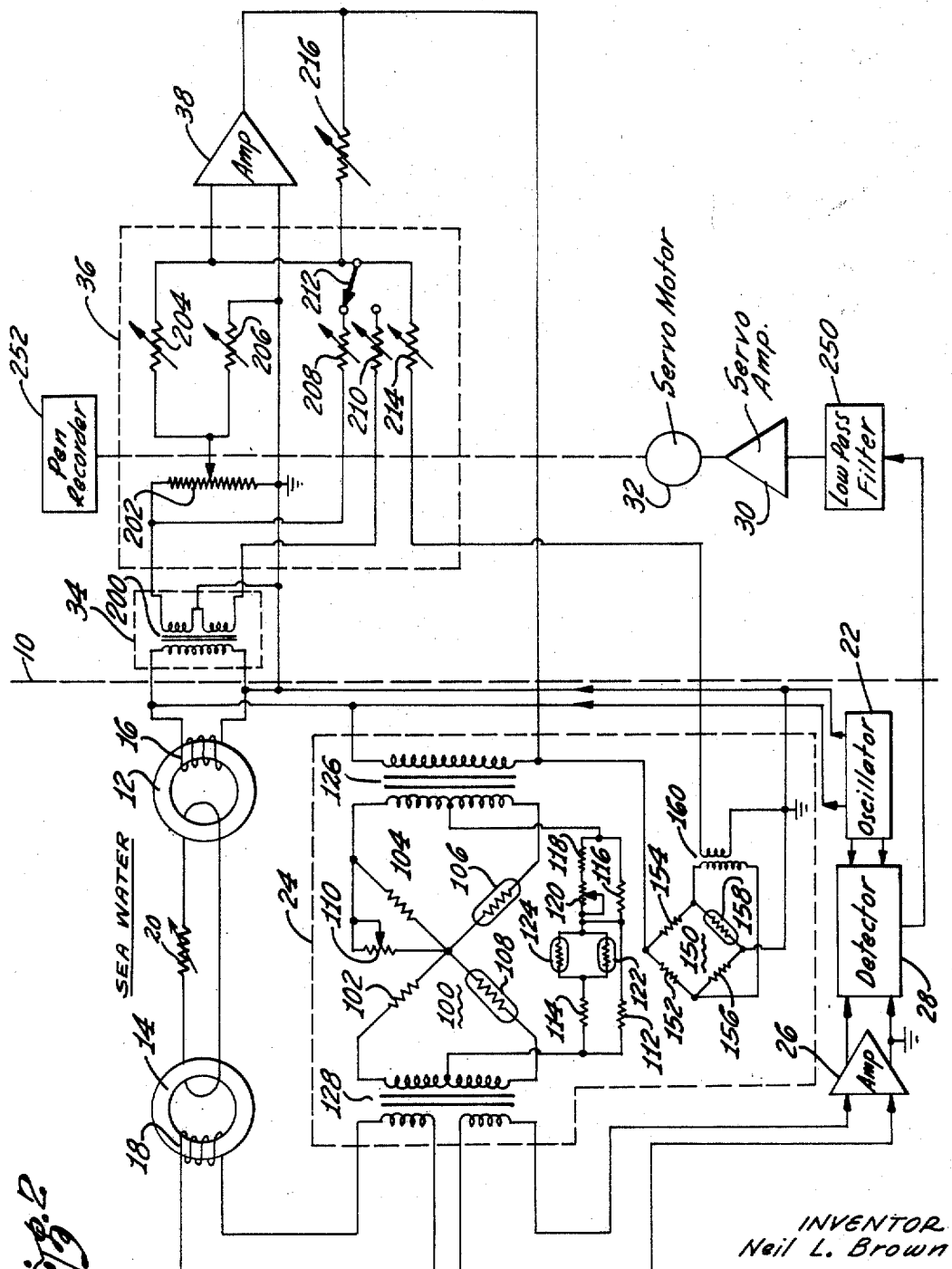
FIGURE 2 is a diagram partially in block and partially in schematic form which illustrates in more detail the particular configuration of the in situ salinity instrument of the present invention shown in FIGURE 1.

In FIGURE 1 a block diagram of a salinity instrument constructed in accordance with the teachings of the present invention is shown. FIGURE 1 includes a dotted line 10 and the portion of the system to the right of the dotted line 10 is located at the collecting station such as on board a ship, and the portion of the system to the left of the dotted line 10 is the sensor unit which is located in the water. FIGURE 1 includes a pair of magnetic cores 12 and 14. Magnetic core 12 includes a first inductive winding 16 and magnetic core 14 includes a second inductive winding 18. The electrical circuits formed by the cores 12 and 14 and windings 16 and 18 are coupled by a loop including a resistance 20. The loop including the resistance 20 is actually formed by the sea water and the resistance resistor 20 represents the conductivity of the sea water. The input signal to the first winding 16 may, therefore, be used to produce an output signal from the second winding 18 which is in accordance with the conductivity of the sea water as represented by the resistance 20.

An oscillator 22 provides a fixed frequency input signal to the input winding 16. The oscillator 22 is also connected to a temperature compensation circuit 24. The temperature compensation circuit provides for temperature compensation of the output signal produced at the output winding 18. The temperature compensation is needed since the conductivity of the sea water as represented by the resistance 20 varies in accordance with the temperature of the sea water. The temperature compensation will be explained in greater detail with reference to FIGURE 2.

The output from the output winding 18 including temperature compensation provided by the temperature compensation circuit 24 is applied to an amplifier 26. The amplifier 26 is coupled to one side of a detector 28. The other side of the detector 28 receives the output signal from the oscillator 22. The detector 28 detects the difference between the signal supplied by the oscillator 22 and the temperature compensated output signal from the amplifier 26. The difference between the two signals applied to the detector 28 represents the salinity of the sea water as measured by the conductivity of the sea water. The output from the detector 28 is supplied to an amplifier 30 which in turn drives a servo motor 32.

The oscillator 22 is also coupled to an impedance matching circuit 34 and the output of the impedance matching circuit 34 is connected to a balancing circuit 36. A long cable is used to connect the oscillator 16 to the impedance matching circuit 34 and the impedance matching circuit matches the impedance of the cable with the balancing circuit 36. The balancing circuit 36 includes a variable impedance element which is controlled by the servo motor 32 as designated by the dotted connection between the servo motor 32 and the balancing circuit 36. The balancing circuit 36 also includes other impedance elements so as to provide for a change in the range of salinity measurement. In addition, the balancing circuit also includes means to compensate for variations in the ratio between conductivity and salinity. The particular details of the balancing circuit 36 will be explained in greater detail with reference to FIGURE 2.

The output from the balancing circuit 36 is applied to an amplifier 38 and the output from the amplifier 38 is coupled back to the temperature compensation circuit 24. The temperature compensation circuit 24 is, therefore, supplied with an input signal which is in accordance with the signals from the oscillator 22 and the amplifier 38. The signal from the oscillator 22 is constant so that the input to the temperature compensating circuit 24 varies in accordance with the signal from the amplifier 38. Since the balancing circuit 36 provides for compensation for variations in the ratio between conductivity and salinity, the input signal to the temperature compensation circuit 24 varies in accordance with salinity. The total temperature compensation of the system of FIGURE 1 is, therefore, compensated not only for changes in temperature but also for changes in salinity so that the output signal from the amplifier 26 supplied to the detector 28 is substantially compensated for variations in conductivity due to changes in temperature and for variations in the temperature compensation due to changes in salinity and, finally, for variations in the ratio between salinity and conductivity. The input to the detector 28 is, therefore, substantially corrected for all major errors.

As the balancing circuit 36 is adjusted by the servo motor 32 so as to balance the closed loop, the temperature compensation is automatically adjusted for changes in salinity. In addition, the balancing of the variable element contained within the balancing circuit 36 may be used to give a direct indication of the salinity so that the balancing of the closed loop provides for an automatic continuous measurement of salinity. The particular type of output indicator may be by any known type and, for example, a pen recorder may be used to provide for a graphic record of the salinity.

In FIGURE 2, the elements which are similar to the elements in FIGURE 1 are given the same reference character. In FIGURE 2 the dotted line 10 again subdivides the system into the left portion which is part of the sensor unit and is located in the water and the right portion which is located at the collecting station such as the ship. The system of FIGURE 2 includes the pair of magnetic cores 12 and 14 having the windings 16 and 18 disposed on the cores 12 and 14. The sea water forms a loop between the cores 12 and 14 and the conductivity of the sea water is represented by the resistor 20. The output signal from the winding 18, therefore, represents the conductivity of the sea water.

The oscillator 22 provides a fixed frequency signal to the winding 16 and the difference between the input to the winding 16 and the output from the winding 18 is in accordance with the conductivity of the sea water. The oscillator also feeds the temperature compensating circuit 24 and the output signal from the winding 18 is modified in accordance with the signal from the temeprature compensating circuit. The compensated output signal is then coupled to the detector 28 through the amplifier 26 and the detector 28 produces a control signal in accordance with the difference between the signal provided by the oscillator 22 and the compensated output signal from the amplifier 26.

The temperature compensating circuit 24 includes a first double-bridge circuit 100. The first double-bridge circuit includes resistors 102, 106 and 108 plus a variable resistor 110. The resistors 106 and 108 are temperature-dependent resistors and, as an example, may be platinum thermometers which provide a variable resistance in accordance with temperature. The double-bridge circuit 100 provides compensation for variations in the conductivity in the sea water with changes in temperature. The resistors 106 and 108 are located adjacent to the windings 16 and 18 so as to experience the same temperature conditions as the sea water loop.

FIGURE 3 illustrates the variations in the conductivity of the sea water with changes in the temperature of the sea water. Curve 200 represents the variations of the conductivity of the sea water with changes in temperature. It is to be noted that curve 200 is non-linear in that changes in the temperature of the sea water do not provide proportional changes in the conductivity of the sea water. The compensation provided by the pair of temperature variable resistors 106 and 108 is linear and provides compensation as shown by the dotted line 202 in FIGURE 3.

Although the difference between the actual temperature 200 and the compensating curve 202 provided by the resistors 106 and 108 is small, it is desirable to provide even more accurate compensation. The double-bridge circuit 100, therefore, includes an additional branch for providing a more accurate temperature compensation of the variations of the conductivity of the sea water with changes in temperature. Specifically, the branch includes resistors 112, 114, 116 and 118 and a variable resistor 120 to provide for an adjustment of the resistance of the branch. In addition, the branch includes temperature-variable resistors 122 and 124 which provide for a variation in resistance in accordance with the temperature of the sea water. The resistors 122 and 124 may be temperature-variable resistors commonly designated as thermistors.

The temperature-variable resistors 108, 106, 122 and 124 are all located in a position adjacent to and relatively close to the windings 16 and 18 so that the resistors experience the same temperature as the loop of sea water which couples the windings 16 and 18. The bridge 100, therefore, provides for a temperature compensation of the output signal from the output winding 18. The input to the bridge 100 is through transformer 126 and the output from the bridge 100 is through output transformer 128.

The temperature compensation provided by the double bridge 100 is only accurate for one value of salinity. For example, the temperature compensation provided by the bridge 100 may be adjusted so as to compensate for variations in temperature for a salinity of 35 parts per thousands (p.p.t.). If the salinity changes from the one particular value of salinity such as 35 p.p.t., there is a variation in the temperature coefficient so that the temperature compensation bridge 100 does not provide for a complete compensation for changes in temperature.

It is, therefore, desirable to provide compensation for errors in the temperature compensation in accordance with changes in the salinity. This additional temperature compensation may be referred to as a second order temperature compensation and this second order temperature compensation is provided for by a resistance bridge 150. FIGURE 4 illustrates the errors which occur for changes in temperature for different values of salinity. For example, it can be seen in FIGURE 4 that for a value of 35 p.p.t. the temperature error is zero with changes in temperature. The zero error indicates that the bridge 100 is providing the proper temperature compensation at one value of salinity. However, when the salinity changes to a value other than 35 p.p.t., the temperature error is either plus or minus, depending upon the value of the salinity. In FIGURE 4 it is illustrated that all of the various error curves pass through zero at a single temperature point and it is to be appreciated that the particular temperature point is in accordance with the particular calibration of the system of FIGURE 2.

The second order temperature compensation bridge includes resistors 152, 154 and 156 and a temperature-dependent resistor 158 which may be a thermistor located at a position so that the thermistor experiences the same temperature conditions as the sea water which is being measured. The input to the bridge 150 is through the transformer 126. The output from the bridge 150 is taken from a transformer 160 and is applied within the balancing circuit 36. It is to be noted, however, that the output from the summing amplifier 38 is coupled back to the input to the bridge 150 and one side of the transformer 126, and that the output from the summing amplifier is in accordance with the salinity of the sea water. Therefore, the input to the bridge 150 is in accordance with the salinity of the sea water and the output from the bridge 150 is coupled to the balanced circuit 36 so as to provide for variations in the balanced circuit in accordance with the particular temperature conditions of the sea water. The ultimate effect is to provide for a second order temperature compensation which compensates for variations in the temperature compensation provided by the double bridge 100 with changes in salinity.

The oscillator 22 is coupled to the balancing circuit 36 through the impedance matching circuit 34 which includes an impedance matching transformer 200. The output from the impedance matching transformer 200 is coupled to one end of a potentiometer 202. The potentiometer 202 feeds a pair of variable resistors 204 and 206. The output from the variable resistors 204 and 206 is fed to the amplifier 38. The opposite sides of the transformer 200 are connected to a second pair of variable resistors 208 and 210. A switch 212 connects one or the other of the variable resistors 208 and 210 to the input to the amplifier 38. Finally, the input to the amplifier 38 is also coupled to the transformer 160 through a variable resistor 214.

The amplifier 38 also includes a feedback resistor shown as variable resistor 216. Various portions of the above circuit are shown to be connected to a reference potential such as ground. For example, one end of the potentiometer 202 may be coupled to a reference potential such as ground and one end of the transformer 160 may be coupled to a reference potential such as ground.

The variable arm of the potentiometer 202 is operated by the servomotor 32. The servomotor in turn is controlled by the servo amplifier 30. The detector 28 provides an output signal in accordance with the difference in the output signal supplied by the oscillator 22 and the compensated output signal from the amplifier 26. For convenience, the detector 28 may provide a D.C. signal and the servo path, therefore, includes a low-pass filter 250 to eliminate any alternating current. The servo amplifier and servo motor 30 and 32 may also operate on D.C.

The servo motor, therefore, controls the position of the variable arm of the potentiometer 202 in accordance with the signal produced by the detector 28. In addition, the servo motor may also operate a pen recorder 252 so that as the position of the variable arm of the potentiometer 202 is varied, the pen recorder 252 provides for an automatic graphic recording of the position of the variable arm. The potentiometer 202 is varied so as to produce a balance in the closed loop servo system. The balance of the closed loop system provides for an indication of the salinity of the sea water.

Specifically, in the operation of the system of FIGURE 2, the double bridge 100 is adjusted so as to provide for compensation of the changes in conductivity of the sea water with changes in temperature for a particular value of salinity. For example, the double bridge 100 may be adjusted to produce a first order temperature compensation for a salinity value of 35 p.p.t. The second order temperature compensating bridge 150 is adjusted to compensate for errors in the first order temperature compensation with changes in salinity. For example, as shown in FIGURE 4, the bridge 150 may be adjusted to provide for a zero change in temperature compensation when the temperature is at the value shown where all of the curves cross. For other values of temperature, the temperature compensating bridge 150 provides for variations in the first order temperature compensation in accordance with salinity. The salinity information is fed into the bridge 150 by the output signal from the amplifier 38.

The various resistors 204, 206, 208, 210, 214 and 216 are used to provide control in the balanced circuit 36 so that the position of the arm of the potentiometer 202 is in accordance with the salinity. For example, the variable resistor 204 is used to change the range of measurements. When the value of variable resistor 204 is large, the range of measurements is small and when the value of the variable resistor 204 is small, the range of measurements is large. Also, the ratio of the resistor 216 to the resistor 204 determines the gain in the system including the amplifier 38.

The resistor 206 is used to load the output from the potentiometer 202. The potentiometer 202 has a linear output in accordance with the position of the arm but the conductivity of the sea water, as represented by the resistance 20, does not vary in proportion to the salinity of the sea water. For example, as shown in FIGURE 5, the ratio between the salinity and conductivity is represented by the solid curve 300. The dotted line 302 represents the normal output from the potentiometer 202 without the resistor 206. It is possible to design a potentiometer having a non-linear characteristic, but this would be extremely expensive. The resistor 206 is, therefore, included and is adjusted so as to produce a curve as shown by the curve 300 in FIGURE 5.

Either the resistor 208 or the resistor 210 is coupled to the input of the amplifier 38 by the switch 212. The resistors 208 and 210 are used to provide for an adjustment of the zero setting of the instrument of FIGURE 2. For example, the bridge 100 is usually adjusted for a zero setting with a salinity of 35 p.p.t. and the second bridge 150 provides for compensations for errors in the first order temperature compensation with changes in salinity. However, it may be desirable to adjust for a zero setting at some salinity value other than 35 p.p.t. The resistor 208 may be adjusted to provide for a zero setting for salinity values above 35 p.p.t. and the resistor 210 may be adjusted to provide for a zero setting for salinity values below 35 p.p.t.

Finally, the resistor 214 is coupled to the amplifier 38 from the output of the bridge 150. The output from the bridge 150 provides for the second order temperature compensation and this second order temperature compensation is interjected into the system through the amplifier 38. The output from the amplifier 38 is, therefore, in accordance with salinity as determined by the position of the potentiometer 202 and as modified by the resistors 204, 206, 208, 210 and 214. The output from the amplifier 38 is then coupled to the input of the bridge 150 so that the second order temperature compensation is in accordance with the salinity and the output from the amplifier 38 is also coupled to the bridge 100 through one side of the transformer 126. Therefore, the input to the bridge 100 also varies in accordance with the salinity of the sea water.

The present invention, therefore, provides for a first order temperature compensation to compensate for variations in the conductivity of the sea water with temperature, a second order temperature compensation to compensate for errors in the first order temperature compensation with changes in salinity, and a compensation for the variation in the ratio between conductivity and salinity. The output from the transformer 128 which is coupled to the amplifier 26 is, therefore, substantially compensated for error.

The detector 28 receives the compensated output signal from the transformer 128 as amplified by the amplifier 26 and produces a control signal which represents the difference between the input from the oscillator 22 and the input from the amplifier 26. The control signal from the detector also controls the servo motor 32 so as to provide for an adjustment in the position of the potentiometer 202 in accordance with the control signal. When the two inputs to the detector 28 are balanced, the position of the arm of the potentiometer 202 represents the salinity of the sea water. As the position of the arm of the potentiometer 202 is adjusted, the pen recorder 252 provides for a graphic recording of the salinity of the sea water.

The present invention, therefore, provides for an in situ salinity instrument which has a direct reading of salinity and wherein the salinity reading has been compensated for first and second order temperature changes and for variations in the ratio between salinity and conductivity. The present invention, therefore, provides for a highly accurate continuous automatic measurement of salinity and although the present invention has been illustrated with reference to a particular embodiment, it is to be appreciated that variations and modifications of this embodiment may be made and the invention is, therefore, only to be limited by the appended claims.

What is claimed is:

1. In combination in a system for measuring the salinity of sea water,
   a first inductive winding,
   a second inductive winding in magnetically coupled relationship to the first winding and with the first and second inductive windings disposed in the sea water,
   first means coupled to the first winding for introducing to the first winding a first signal and for obtaining an induction in the second winding of a second signal having characteristics in accordance with the conductivity of the sea water,
   second means coupled to the second winding and responsive to the second signal for providing variations in the second signal to compensate for variations in the conductivity of the sea water with variations of temperature of the sea water,
   third means coupled to the second winding and responsive to the second signal for providing variations in the second signal to compensate for variations in the ratio between conductivity and salinity, and
   fourth means coupled to the second winding and responsive to the second signal for producing an out-

9 put indication of salinity of the sea water in accordance with the characteristics of the second signal.

2. The combination of claim 1 wherein the second means includes temperature responsive means which are subjected to the same temperature conditions as the first and second inductive windings.

3. The combination of claim 1 additionally including fifth means coupled to the second means to compensate for variations in the compensation provided for by the second means in accordance with the salinity of the sea water.

4. The combination of claim 3 wherein the second and fifth means include temperature responsive means which are subjected to the same temperature conditions as the first and second inductive windings.

5. In combination in a system for measuring the salinity of sea water,
a first inductive winding,
a second inductive winding in magnetically coupled relationship to the first winding and with the first and second inductive windings disposed in the sea water,
first means coupled to the first winding for introducing to the first winding a first signal and for obtaining an induction in the second winding of a second signal having characteristics in accordance with the conductivity of the sea water,
second means coupled to the second winding and responsive to the second signal for providing variations in the second signal to compensate for variations in the conductivity of the sea water with variations of temperature of the sea water and to compensate for variations in the ratio between conductivity and salinity, and
third means coupled to the first and second windings and responsive to the first and second signals for producing an output indication of salinity of the sea water in accordance with the difference in characteristics between the first and second signals.

6. The combination of claim 5 additionally including fourth means coupled to the second means to compensate for variations in the temperature compensation provided for by the second means in accordance with the salinity of the sea water.

7. The combination of claim 6 wherein the second and fourth means are part of a closed loop and additionally including fifth means to automatically balance the closed loop in accordance with the difference between the first and second signals.

8. The combination of claim 7 wherein the third means is coupled to the fifth means to continuously produce the output indication of the salinity of the sea water.

9. In combination in a system for measuring the salinity of sea water,
a first inductive winding,
a second inductive winding in magnetically coupled relationship to the first winding and with the first and second inductive windings disposed in the sea water,
first means coupled to the first winding for introducing to the first winding a first signal and for obtaining an induction in the second winding of a second signal having characteristics in accordance with the conductivity of the sea water,
second means coupled to the second winding and responsive to the second signal for providing variations in the second signal to compensate for variations in the conductivity of the sea water with variations of temperature of the sea water,
third means coupled to the second means for providing variations in the temperature compensation provided by the second means in accordance with variations in the salinity of the sea water, and
fourth means coupled to the second winding and responsive to the second signal for producing an output indication of salinity of the sea water in accordance with the characteristics of the second signal.

10. The combination of claim 9 additionally including fifth means coupled to the third means for controlling the compensation produced by the third means and with the fifth means including means to compensate for variations in the ratio between conductivity and salinity.

11. The combination of claim 10 wherein the second, third and fifth means are part of a closed loop and additionally including sixth means to automatically balance the closed loop in accordance with the difference between the first and second signals.

12. The combination of claim 11 wherein the fourth means is coupled to the sixth means and is responsive to the balancing of the closed loop to continuously produce the output indication of the salinity of the sea water.

13. In combination in a system for measuring the salinity of sea water,
a first inductive winding,
a second inductive winding in magnetically coupled relationship to the first winding and with the first and second inductive windings disposed in the sea water,
first means coupled to the first winding for introducing to the first winding a first signal and for obtaining an induction in the second winding of a second signal having characteristics in accordance with the conductivity of the sea water,
second means coupled to the first and second windings for providing a closed loop around the first and second windings and including variable means,
third means coupled to the first and second windings and responsive to the first and second signals to produce a control signal having a value in accordance with the difference between the first and second signals and with the third means coupled to the second means to control the variable means in accordance with the value of the control signal for balancing the closed loop.

14. The combination of claim 13 wherein the closed loop includes additional means to provide for a compensation of the second signal for the variations of conductivity in accordance with the variations of temperature of the sea water.

15. The combination of claim 13 wherein the closed loop includes additional means to provide for a compensation of the second signal for the variations in the ratio between the conductivity and the salinity of the sea water.

16. The combination of claim 13 wherein the control of the variable means produces an output indication of the salinity of the sea water.

17. In combination in a system for measuring the salinity of sea water,
a first inductive winding,
a second inductive winding in magnetically coupled relationship to the first winding and with the first and second inductive windings disposed in the sea water,
first means coupled to the first winding for introducing to the first winding a first signal and for obtaining an induction in the second winding of a second signal having characteristics in accordance with the conductivity of the sea water,
second means coupled to the first and second windings and responsive to the first and second signals for providing a closed loop between the first and second signals and for providing variations in the second signal to compensate for errors in the second signal and to produce an output signal having characteristics in accordance with the salinity of the sea water and with the second means including a variable means, third means coupled to the first and second windings and responsive to the first and second signals for providing a control signal having a value in accordance with the difference between the first and second signals and with the third means coupled to the second means to control the variable means in accordance with the value of the control signal for producing a balance in the closed loop.

18. The combination of claim 17 wherein the second means includes means to compensate for variations of the conductivity in accordance with temperature, for variations of the temperature compensation in accordance with salinity and for variations in the ratio between conductivity and salinity.

19. The combination of claim 17 wherein the control of the variable means produces an output indication of the salinity of the sea water.

References Cited

UNITED STATES PATENTS

| 3,292,077 | 12/1966 | Sloughter | 324—30 |
| 3,389,332 | 6/1968 | Ketcham | 324—30 |

ARCHIE R. BORCHELT, Primary Examiner

C. F. ROBERTS, Assistant Examiner

U.S. Cl. X.R.

324—99

UNITED STATES PATENT OFFICE
CERTIFICATE OF CORRECTION

Patent No. 3,491,287 January 20, 1970

Neil L. Brown

It is certified that error appears in the above identified patent and that said Letters Patent are hereby corrected as shown below:

In the heading to the printed specification, lines 6 and 7, "The Blissett-Berman Corporation" should read -- The Bissett-Berman Corporation --.

Signed and sealed this 10th day of November 1970.

(SEAL)
Attest:

Edward M. Fletcher, Jr.
Attesting Officer

WILLIAM E. SCHUYLER, JR.
Commissioner of Patents